(12) United States Patent
Darrenkamp

(10) Patent No.: US 10,562,408 B2
(45) Date of Patent: Feb. 18, 2020

(54) ANODE EXHAUST RESERVOIR ASSEMBLY

(71) Applicant: Ford Motor Company, Dearborn, MI (US)

(72) Inventor: Alysa Darrenkamp, Dearborn, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 189 days.

(21) Appl. No.: 15/709,833

(22) Filed: Sep. 20, 2017

(65) Prior Publication Data

US 2019/0084442 A1 Mar. 21, 2019

(51) Int. Cl.
| | |
|---|---|
| *B60L 58/33* | (2019.01) |
| *H01M 8/04223* | (2016.01) |
| *H01M 8/04082* | (2016.01) |
| *H01M 8/04119* | (2016.01) |

(52) U.S. Cl.
CPC ......... *B60L 58/33* (2019.02); *H01M 8/04082* (2013.01); *H01M 8/04164* (2013.01); *H01M 8/04231* (2013.01); *H01M 8/04253* (2013.01); *H01M 8/04126* (2013.01); *H01M 2250/20* (2013.01)

(58) Field of Classification Search
CPC .................. H01M 8/04164; H01M 8/04231
See application file for complete search history.

(56) References Cited

U.S. PATENT DOCUMENTS

| 7,338,545 B2 | 3/2008 | Bazzarella et al. | |
| 8,277,988 B2* | 10/2012 | Goebel | H01M 8/04097 |
| | | | 429/414 |
| 8,563,182 B2 | 10/2013 | Goebel et al. | |
| 2007/0259241 A1* | 11/2007 | Miyamoto | H01M 8/04097 |
| | | | 429/411 |
| 2007/0287055 A1* | 12/2007 | Ueda | H01M 8/04126 |
| | | | 429/414 |
| 2010/0248043 A1* | 9/2010 | Turner | F01K 15/02 |
| | | | 429/410 |
| 2011/0269034 A1* | 11/2011 | Yamamoto | H01M 8/04022 |
| | | | 429/410 |
| 2012/0135322 A1* | 5/2012 | Yoshimine | H01M 8/04141 |
| | | | 429/410 |
| 2014/0242481 A1* | 8/2014 | Procter | H01M 8/04007 |
| | | | 429/414 |

(Continued)

FOREIGN PATENT DOCUMENTS

WO WO-2014174299 A1 * 10/2014

*Primary Examiner* — Matthew J Merkling
(74) *Attorney, Agent, or Firm* — David B. Kelley; Brooks Kushman P.C.

(57) ABSTRACT

An anode exhaust assembly including a housing and a base member is provided. The base member supports the housing and includes a base reservoir having a channel reservoir defined between two walls and a purge outlet open to the channel reservoir. Each of the walls defines an opening fluidly connecting the reservoirs located at a base reservoir inner surface such that fluid accumulating on a housing inner surface collects in the base reservoir prior to entering the channel reservoir. A cone member may be secured to an inner surface of the housing and include at least one cone opening oriented within the housing to direct fluid from a housing cavity to the base reservoir and not to the channel reservoir.

17 Claims, 11 Drawing Sheets

(56) References Cited

U.S. PATENT DOCUMENTS

| | | | |
|---|---|---|---|
| 2016/0072141 A1* | 3/2016 | Rama | H01M 8/04164 |
| | | | 429/414 |
| 2016/0118677 A1 | 4/2016 | Lucas et al. | |
| 2017/0040623 A1 | 2/2017 | Mathie et al. | |
| 2018/0178143 A1* | 6/2018 | Miki | B01D 15/242 |

* cited by examiner

ANODE EXHAUST RESERVOIR ASSEMBLY

TECHNICAL FIELD

This disclosure relates to an assembly to purge fluid from an anode of a fuel cell stack.

BACKGROUND

A vehicle, such as a fuel cell vehicle (FCV) or a fuel cell electric vehicle (FCEV), may contain an energy storage device, such as a fuel cell stack, to power components of the vehicle. The fuel cell stack may be integrated with systems to assist in managing vehicle performance and operations. The fuel cell stack may be used with a thermal management system to assist in managing thermal conditions of the fuel cell stack.

One method to reduce costs for FCV and FCEV powertrains is to execute an anode purge and drain function with one common fluid flow passageway and valve instead of two or more separate passageways and valves.

SUMMARY

An anode exhaust assembly includes a housing and a base member. The base member supports the housing and includes a base reservoir having a channel reservoir defined between two walls and a purge outlet open to the channel reservoir. Each of the walls defines an opening fluidly connecting the reservoirs located at a base reservoir inner surface such that fluid accumulating on a housing inner surface collects in the base reservoir prior to entering the channel reservoir. A cone member may be secured to an inner surface of the housing and include at least one cone opening oriented within the housing to direct fluid from a housing cavity to the base reservoir and not to the channel reservoir. A cap may be mounted to the base member and include a divert member oriented above the channel reservoir to direct fluid to the base reservoir instead of the channel reservoir. Each of the openings may be located at a curvature of the base reservoir. Each of the walls may be arranged upon the base reservoir inner surface such that fluid accumulating on the housing inner surface collects in the base reservoir prior to entering the channel reservoir under freezing thermal conditions. A tube may extend from the channel reservoir to the purge outlet. The tube may be oriented at a positive angle relative to a horizontal axis extending through an antipodal point of the base reservoir.

A vehicle fuel cell system includes an electric machine and a fuel cell stack. The fuel cell stack is in electrical communication with the electric machine and includes an anode exhaust assembly having a purge outlet to purge fluids from an anode. The anode exhaust assembly includes a base member supporting a housing and includes a first wall arranged within a base reservoir of the base member to influence fluid to collect in the base reservoir away from the purge outlet. A cone member may be mounted within the housing to direct fluid to a central portion of the base reservoir. The first wall may define a spiral shape having an epicenter located at the central portion and an end portion located adjacent the purge outlet. The base member may further include a second wall. The first wall and the second wall may extend across the base reservoir to define a channel reservoir open to the purge outlet. Each of the first wall and the second wall may define an opening arranged relative to a curvature of the base reservoir to influence fluid distributed within the housing to collect in the base reservoir prior to entering the channel reservoir. A cap may be mounted to the base member and include a divert member oriented above a channel reservoir defined by the first wall to direct fluid to the base reservoir instead of the channel reservoir. A tube may be open to the purge outlet and extend into a channel reservoir defined by the first wall. The first wall may define a horseshoe-shaped channel reservoir and an opening fluidly connecting the base reservoir and the horseshoe-shaped channel reservoir such that fluid collects in the base reservoir prior to entering the horseshoe-shaped reservoir.

An anode exhaust assembly includes a housing and a base member. The base member supports the housing and includes a base reservoir having a semi-spherical shape and a channel reservoir defined by at least one wall and including a purge outlet open to the channel reservoir. The at least one wall defines a first opening fluidly connecting the base reservoir to the channel reservoir, and the first opening may be located at a curvature of an inner surface of the base reservoir such that fluid collecting on a housing inner surface travels to the base reservoir prior to entering the channel reservoir. A cone member may be secured within the housing and include at least one cone opening oriented above a portion of the base reservoir to direct fluid collecting within the housing to the base reservoir. The at least one wall may be horseshoe-shaped and the first opening may be located at a curve of the horseshoe shape. The base member may include a second wall defining a second opening. The at least one wall and the second wall may extend across the base reservoir and may be spaced from one another to further define the channel reservoir. The second opening may be located opposite the first opening upon another curvature of the inner surface of the base reservoir such that fluid collects within the base reservoir prior to entering the channel reservoir. A cap may be mounted to the base member and include a divert member oriented above the channel reservoir to direct fluid to the base reservoir instead of the channel reservoir.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
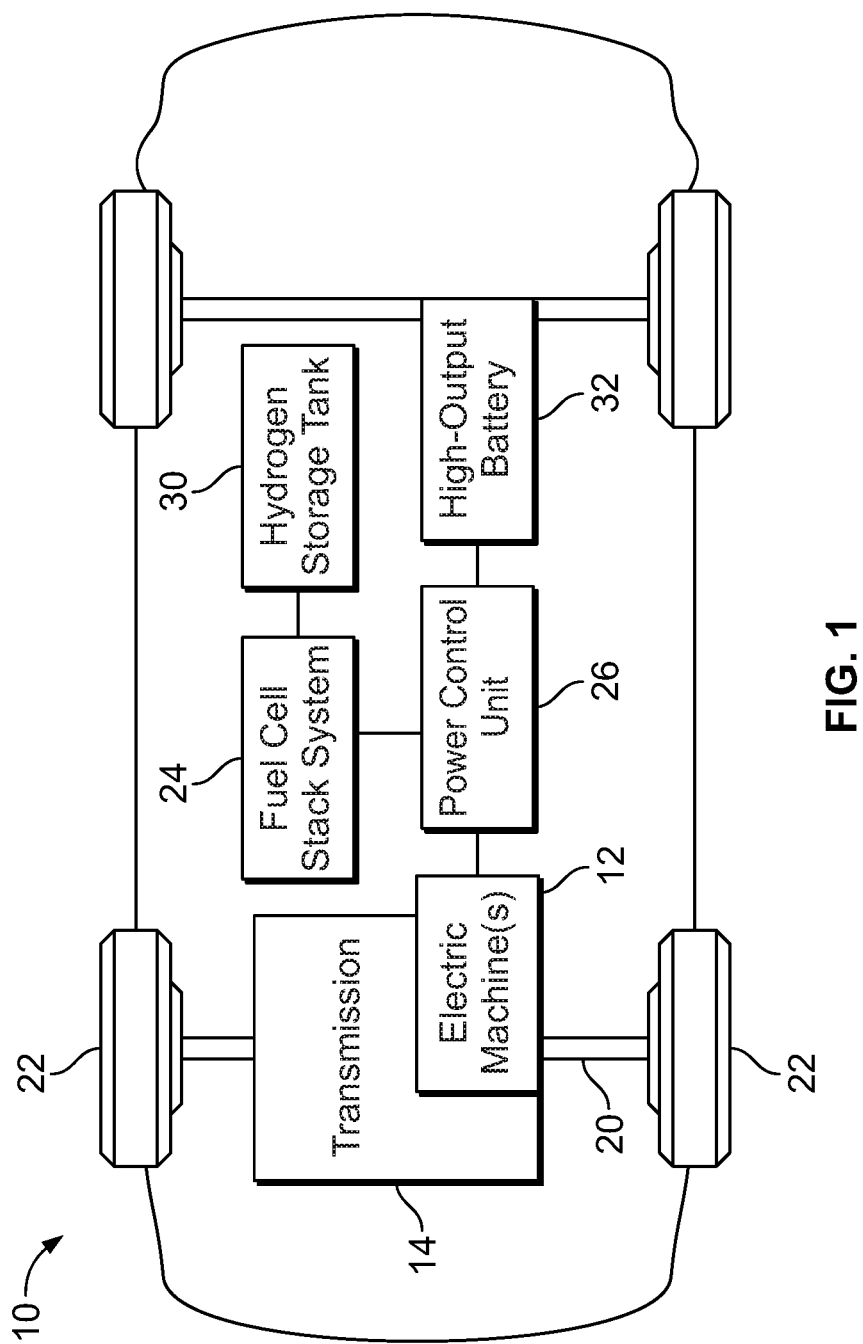
FIG. 1 is a schematic diagram illustrating an example of a fuel cell vehicle.

FIG. 1 depicts a schematic diagram of an example of a fuel cell vehicle, referred to generally as a vehicle 10 herein. The vehicle 10 may include one or more electric machines 12 mechanically connected to a transmission 14. Each of the electric machines 12 may be capable of operating as a motor or a generator. The transmission 14 may also be mechanically connected to a drive shaft 20 that is mechanically connected to a set of front wheels 22 or rear wheels. The electric machines 12 may provide propulsion and deceleration capability. A fuel cell stack system 24 may generate electric current to power components of the vehicle 10. For example, a hydrogen and oxygen delivery system may operate with the fuel cell stack system 24 to convert hydrogen gas and oxygen into electric current to power the electric machines 12. The electric current may be referred to as a load. The fuel cell stack system 24 may include one or more fuel cells, such as a polymer electrolyte membrane (PEM) fuel cell, making up a fuel cell stack.

The fuel cell stack system 24 may also include a thermal management system and/or an air flow control system. A power control unit 26 may govern a flow of electricity within the vehicle 10. For example, the power control unit 26 may govern the flow of electricity between the fuel cell stack system 24 and the electric machines 12. A hydrogen storage tank 30 may store hydrogen gas for use by the fuel cell stack system 24. A high-output battery 32 may store energy generated from, for example, a regenerative braking system and may provide supplemental power to the electric machines 12.

The various components described above may have one or more associated controllers to control and monitor the operation of the components. The controllers may communicate via a serial bus (e.g., Controller Area Network (CAN)) or via discrete conductors.

Figure 2:
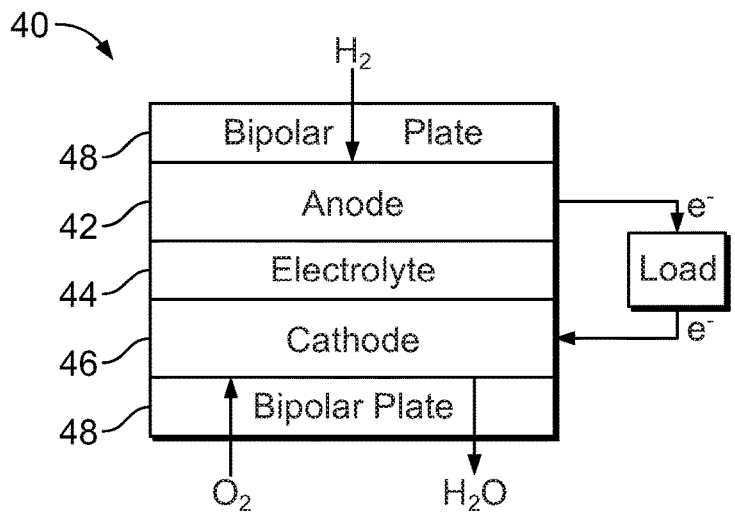
FIG. 2 is a schematic diagram illustrating an example of a fuel cell.

FIG. 2 depicts a schematic diagram of an example of a proton exchange membrane (PEM) fuel cell, referred to generally as a PEM fuel cell 40 herein. The PEM fuel cell 40 is one example of a fuel cell which may operate in the fuel cell stack system 24 described above. The PEM fuel cell 40 may include an anode 42, an electrolyte 44, and a cathode 46. Chemical reactions may occur at interfaces between the anode 42, the electrolyte 44, and the cathode 46. For example, the anode 42 may receive a fuel, such as hydrogen, and oxidize the fuel to convert the fuel into one or more positively charged ions and one or more negatively charged electron. The electrolyte 44 may permit the ions to pass through to the cathode 46 while redirecting the electrons around the electrolyte 44 to create a load. The electrons may rejoin the ions within the cathode 46. The cathode 46 may receive a chemical, such as oxygen, to react with the ions and electrons to create, for example, water or carbon dioxide. Bipolar plates 48 may assist in distributing fuel and oxidant within the PEM fuel cell 40, facilitating water management with the PEM fuel cell 40, separating fuel cells within a fuel cell stack, and facilitating thermal management of the PEM fuel cell 40.

Air and water management relating to a system including a fuel cell may affect a performance thereof. For example, electrodes of the fuel cell may be flooded by liquid water with excess hydration above a normal state which may cause fuel starvation, cell potential or current reversal, or corrosion of the electrodes and bipolar plates. In contrast, too little hydration may cause a higher resistance to proton transport in a membrane, e.g. an electrolyte, of the fuel cell and may facilitate radical scavenging of the membrane. Swings in a hydration state of the system may cause mechanical stresses in the membrane that may also lead to premature membrane failures. Control strategies may vary circulation conditions during operation of the system by adjusting temperatures, flow rates, pressures, and electrical current draw to improve the performance and extend a life of the system.

Figure 3:
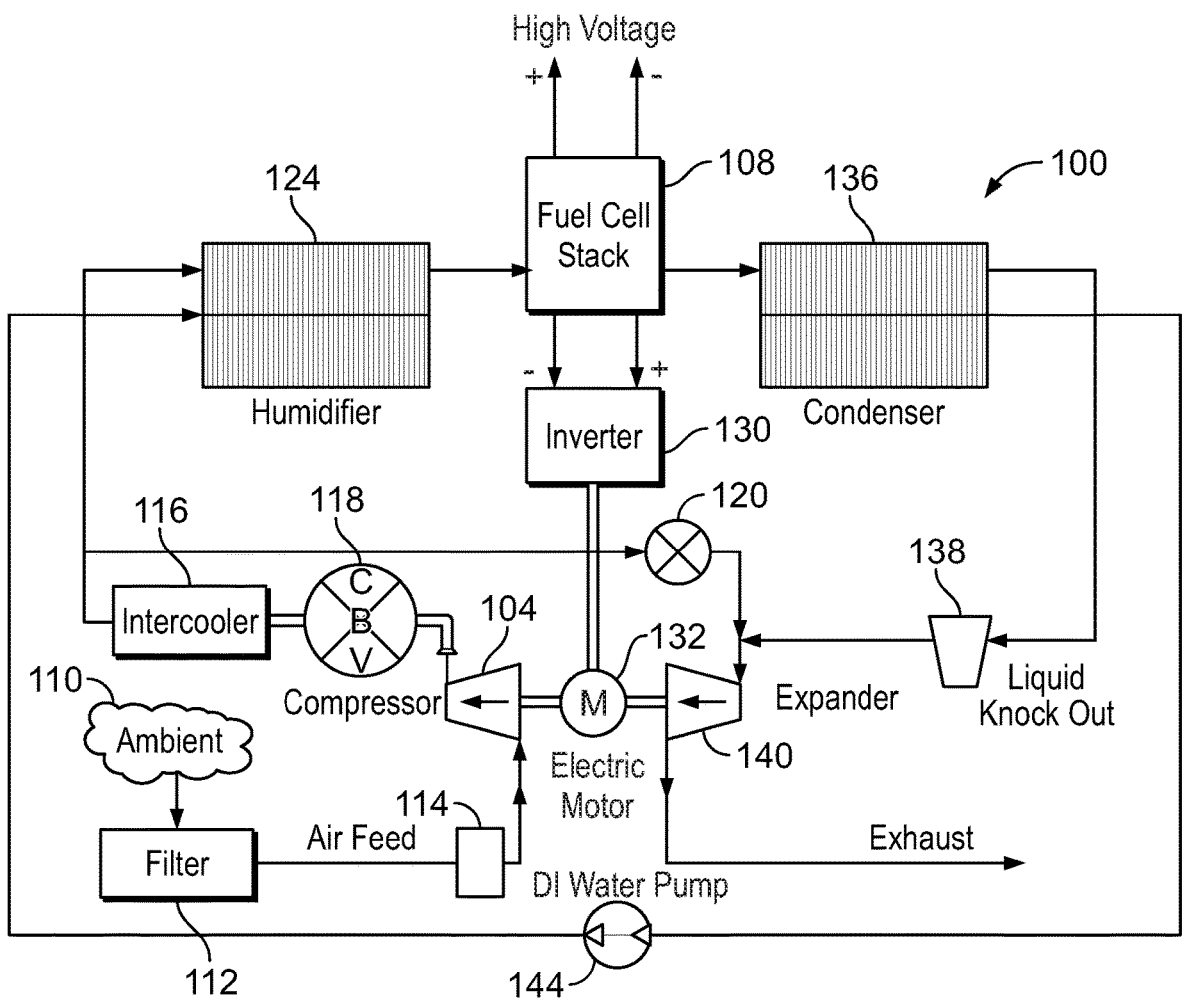
FIG. 3 is a schematic diagram illustrating an example of a fuel cell system.

FIG. 3 shows a schematic diagram illustrating an example of a portion of a circulation circuit of an air control system for a fuel cell stack, referred to as an air control system 100. The air control system 100 may include a compressor 104 positioned up stream of a fuel cell stack 108. Ambient cold air 110 may enter the air control system 100 via a filter 112. A mass air flow sensor 114 may measure an amount of air flowing therethrough. Air may flow from the compressor 104 to an intercooler 116 via a cathode blocking valve 118. A stack bypass valve 120 may divert a portion of the air flowing toward a humidifier 124 enroute to the fuel cell stack 108. The fuel cell stack 108 may transfer power to an inverter 130 enroute to an electric motor 132. The fuel cell stack 108 may also output high voltage power for other vehicle components. A mixture of elements, such as oxygen depleted air, water vapor, and liquid water, exiting the fuel cell stack 108 may pass through a condenser 136 enroute to a liquid knock out 138. The liquid knock out 138 may assist in removing liquid included in the mixture of elements. The remaining portions of the mixture of elements may then travel through an expander 140 enroute to exiting the air control system 100. A de-ionized water pump 144 may assist in transferring water from the condenser 136 to the humidifier 124. The air control system 100 may face operational challenges during a cold-start event due to a temperature of air entering the fuel cell stack 108 and due to the temperature of the fuel cell stack 108.

Figure 4:
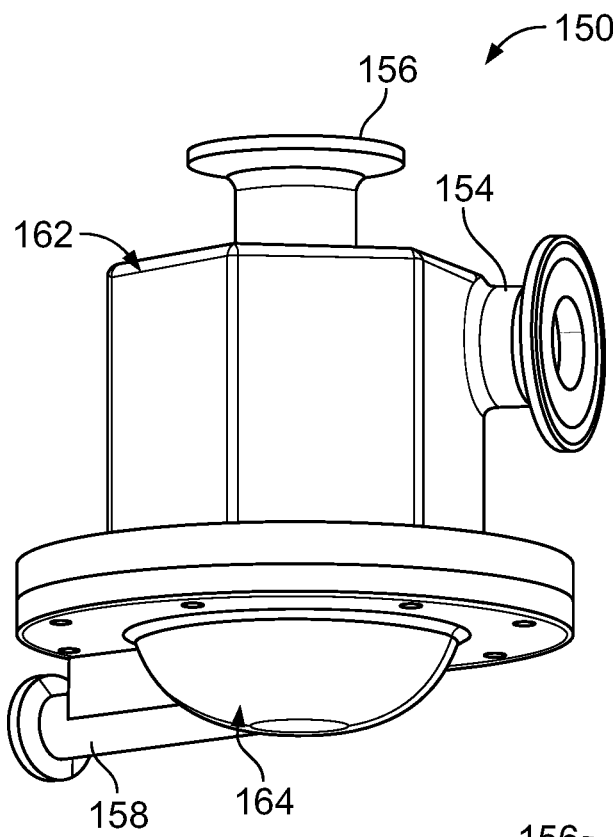
FIG. 4 is a perspective view of an example of a portion of an exhaust reservoir assembly.
Figure 5:
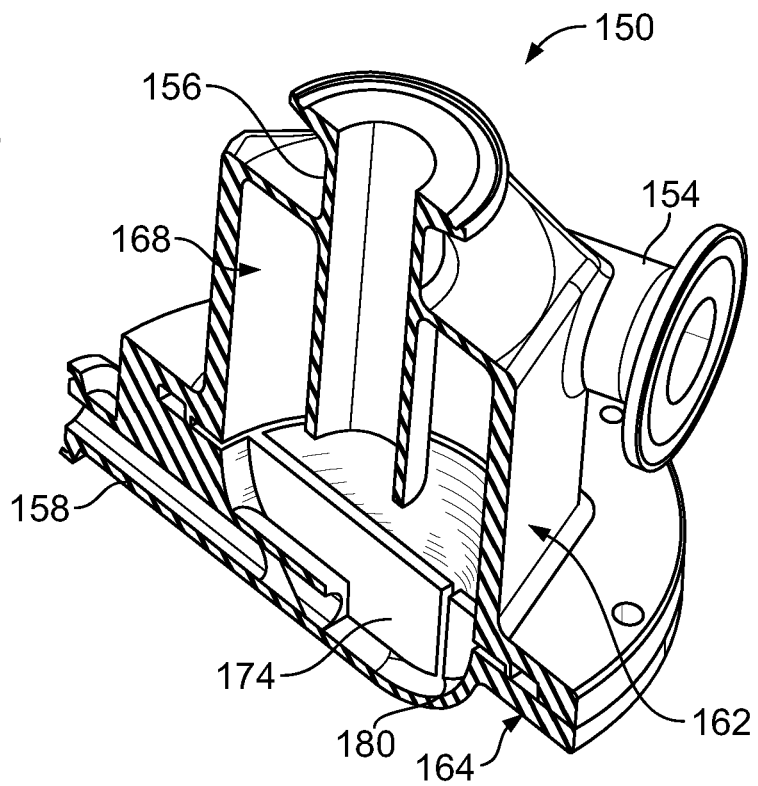
FIG. 5 is a perspective view, in cross-section, of the portion of the exhaust reservoir assembly of FIG. 4.

FIGS. 4 and 5 are perspective views of an example of an anode exhaust assembly, referred to as an anode exhaust assembly 150 herein. The anode exhaust assembly 150 includes an anode knockout (AKO) inlet 154, an AKO recirculation outlet 156, a purge outlet 158, a housing 162, and a base member 164. The AKO inlet 154 is in fluid communication with an anode to receive exhaust therefrom. The purge outlet 158 is in fluid communication with an outlet valve to purge liquids and gases from the anode exhaust assembly 150.

The AKO inlet 154 and the AKO recirculation outlet 156 extend from the housing 162. The purge outlet 158 extends from the base member 164. The purge outlet 158 may have a diameter sufficient to prevent bridging by condensation droplets lining a pipe leading thereto. The purge outlet diameter 185 may be selected to optimized fluid flow velocities for removing accumulate liquids in the pipe.

The housing 162 is mounted to the base member 164. The AKO recirculation outlet 156 extends into a housing cavity 168 defined by the housing 162. The anode exhaust assembly 150 may collect exhaust water from a fuel cell stack system and purge the water through the purge outlet 158. In previous anode exhaust assembly examples, the water could freeze and form ice blocking a purge outlet. The ice would then have to be melted prior to initiating a system fluid purge. Without immediate purge capability, the system may not be able to increase a hydrogen condition to above a robust operational level of fifty percent. The anode exhaust assembly 150 uses walls to define a channel reservoir to prevent water from collecting at the purge outlet 158 such that the water does not block the purge outlet 158 when frozen.

Figure 6:
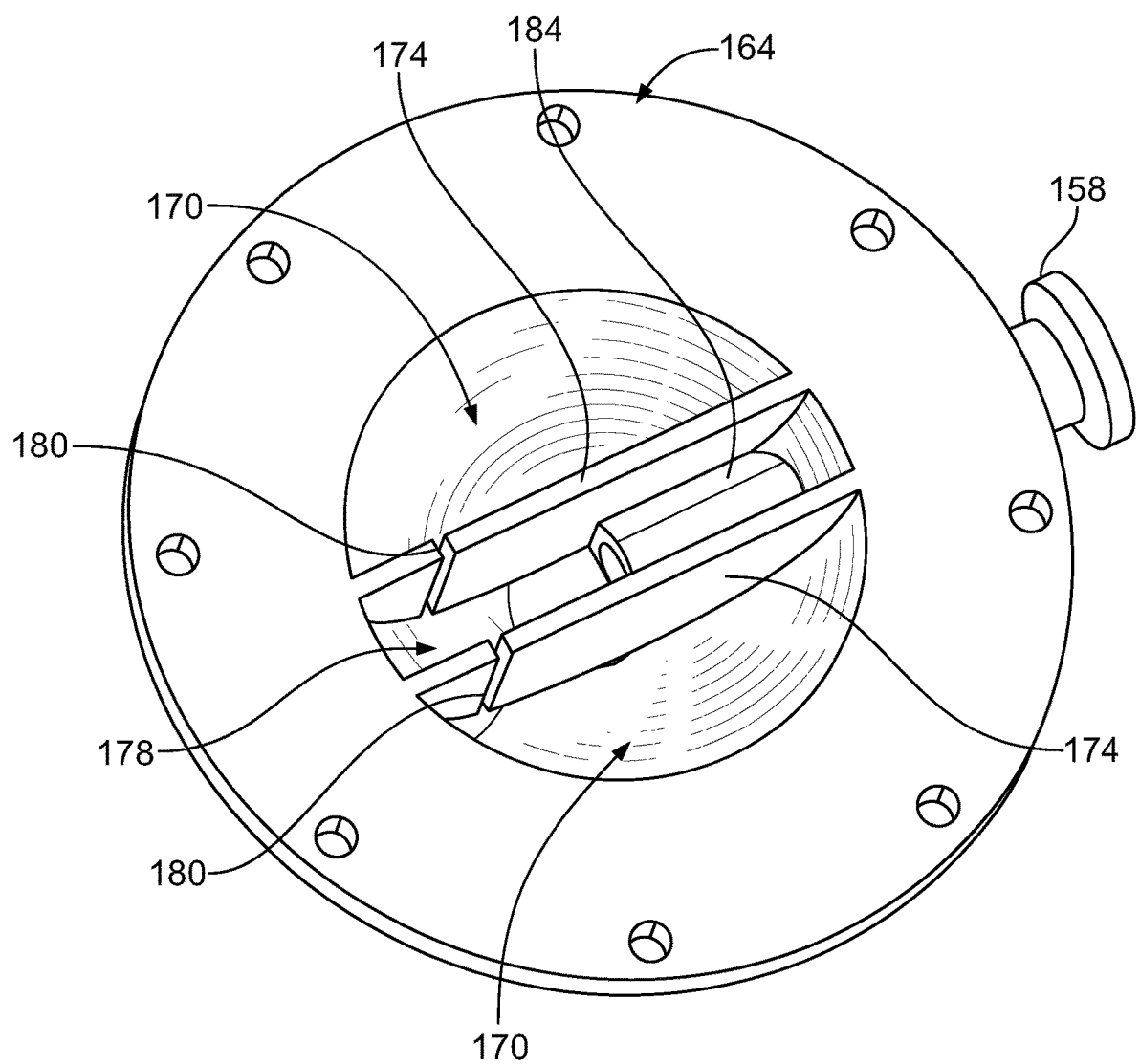
FIG. 6 is a perspective view of a portion of the exhaust reservoir assembly of FIG. 4 with an upper housing removed to show internal components.

FIG. 6 is a perspective view illustrating internal aspects of the base member 164. For example, the base member 164 defines a base reservoir 170 divided by walls 174. In this example, the base reservoir 170 has two sections and is a bowl shape or semi-spherical shape though it is contemplated that other shapes are available. Each of the walls 174 extend across the base reservoir 170 and the walls 174 are spaced from one another to define a channel reservoir 178. Each of the walls 174 defines an opening 180 providing fluid communication between one of the sections of the base reservoir 170 and the channel reservoir 178. A tube portion 184 of the purge outlet 158 extends into the channel reservoir 178. While the tube portion 184 is shown extending substantially half a length of the channel reservoir 178 in FIG. 6, it is contemplated that the tube portion 184 may extend within the channel reservoir 178 at various lengths.

During operation of the system including the anode exhaust assembly 150, the anode exhaust assembly 150 may purge gas and liquids in one pressure burst through the purge outlet 158. When the fuel cell stack is not operating, fluid may collect within the base reservoir 170. For example, water may condense on an inner surface of the housing 162. The water may then travel down the inner surface and collect in the base reservoir 170 and channel reservoir 178. Optionally, a cap member or a cone member may be disposed within the housing 162 to influence the water or other fluid to travel to the base reservoir 170 and not the channel reservoir 178 as further described below. Shaded areas 190 represent fluid collected within the base reservoir 170 in FIG. 7. The fluid may collect within the base reservoir 170 until reaching a level of a base of the openings 180 before entering the channel reservoir 178.

Figure 8:
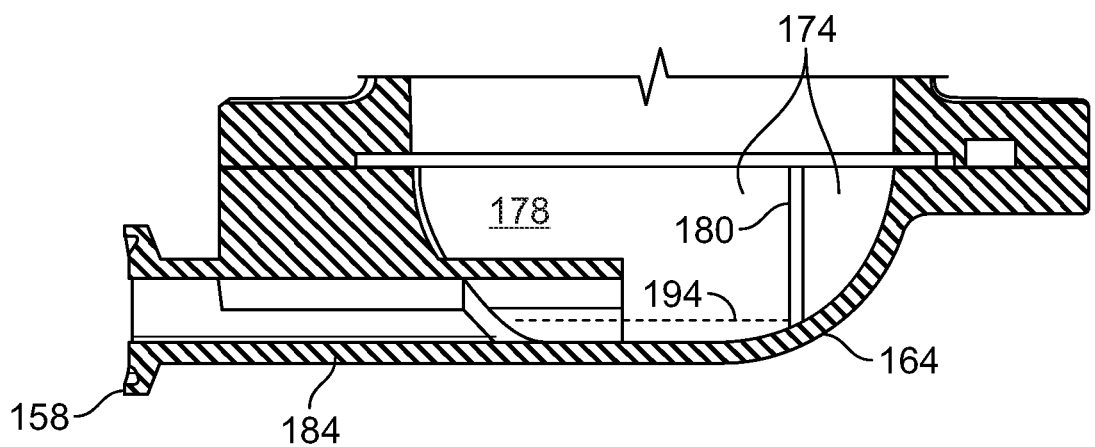
FIG. 8 is a perspective view of the portion of the exhaust reservoir assembly of FIG. 6 showing an example of fluid collection therein.
Figure 9:
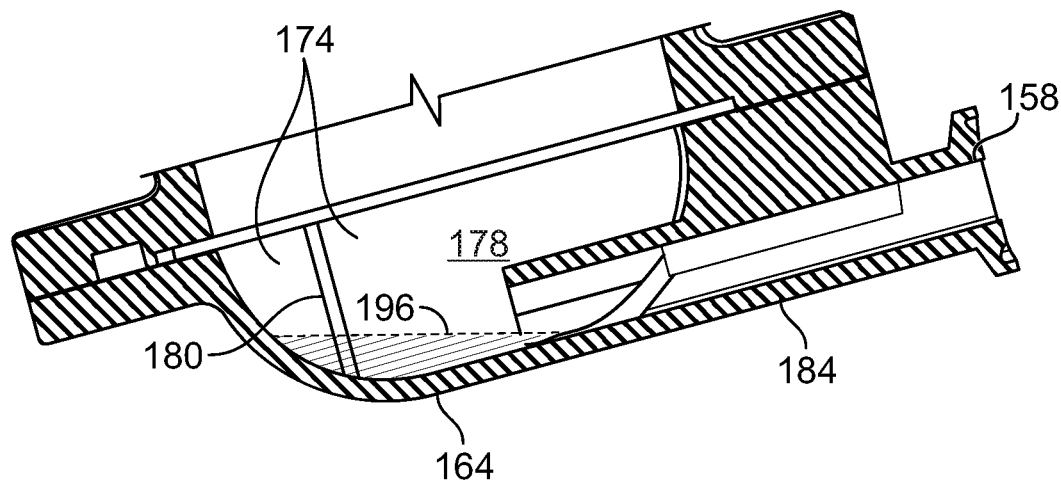
FIG. 9 is a side view, in cross-section, of another portion of the exhaust reservoir assembly of FIG. 4 shown in a first tilted position.
Figure 10:
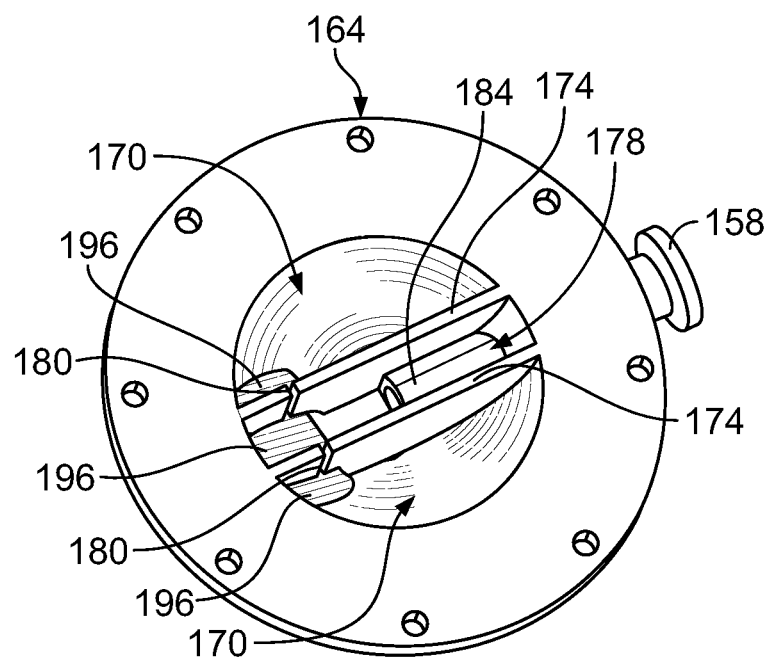
FIG. 10 is a perspective view of the portion of the exhaust reservoir assembly of FIG. 4 showing fluid collection when in the first tilted position.
Figure 11:
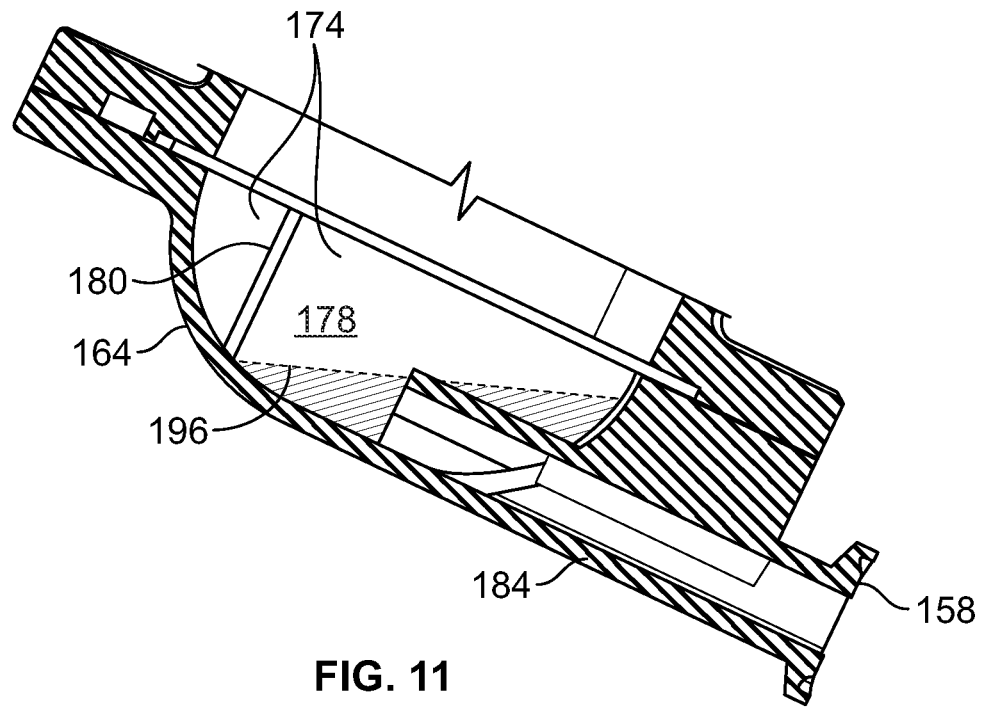
FIG. 11 is a side view, in cross-section, of another portion of the exhaust reservoir assembly of FIG. 4 shown in a second tilted position.
Figure 12:
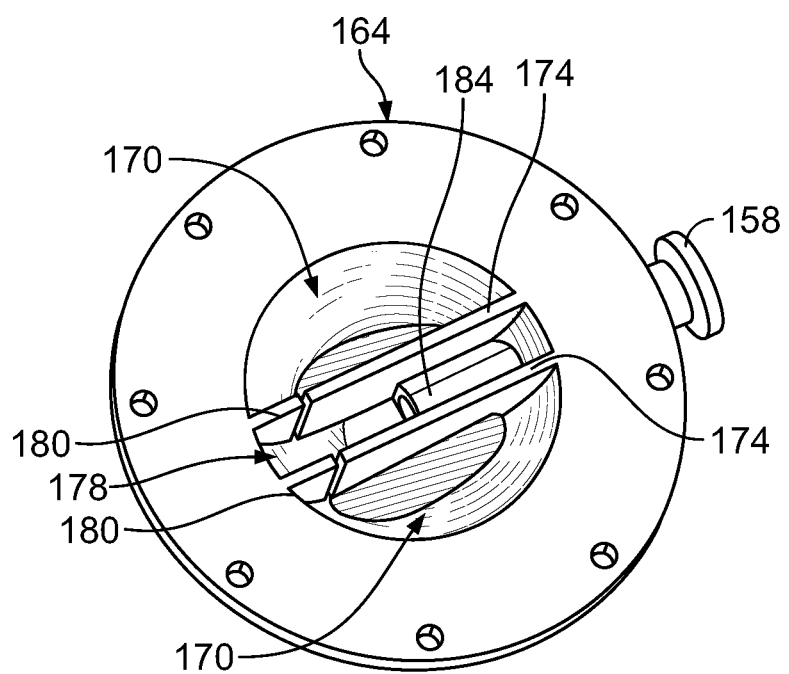
FIG. 12 is a perspective view of the portion of the exhaust reservoir assembly of FIG. 4 showing fluid collection when in the second tilted position.

For example, broken line 194 in FIG. 8 illustrates a level of fluid collection in the base reservoir 170 prior to entering the channel reservoir 178 through one of the openings 180. Each of the openings may be located at a curvature of the base reservoir 170 so that fluid from the housing cavity 168 collects in one of the sections of the base reservoir 170 before entering the channel reservoir 178. To adjust a volume of fluid collected outside of the channel reservoir 178, each of the openings 180 may be defined closer to (volume increase) or further away (volume decrease) from an inner surface of the base member 164. In this example, when the anode exhaust assembly 150 is exposed to cold thermal conditions, the fluid collected in the shaded areas 190 and frozen will not block or plug the purge outlet 158. In contrast, in an example anode exhaust assembly without walls defining a channel reservoir separate from a base reservoir, the fluid may collect at and block a purge outlet.

Figure 7:
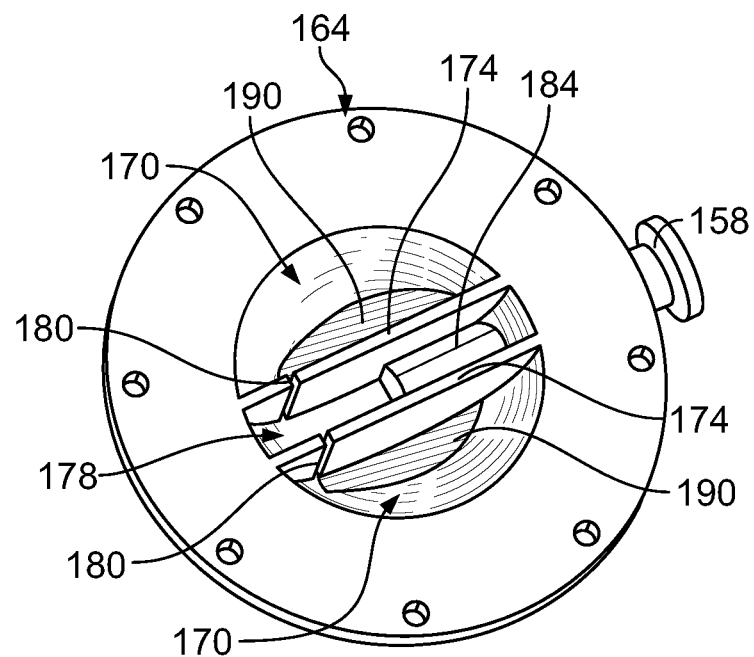
FIG. 7 is a side view, in cross-section, of another portion of the exhaust reservoir assembly of FIG. 4.

FIGS. 9 through 12 illustrate the anode exhaust assembly 150 oriented in different positions in comparison to the orientation shown in FIGS. 7 and 8. As shown, an arrangement of the walls 174 and/or a shape of the base reservoir 170 relative to the purge outlet 158 provides for fluid collection within the base reservoir 170 and away from the purge outlet 158. For example, in FIGS. 9 and 10 the anode exhaust assembly 150 is shown tilted to a first tilted position so fluid collects in a portion of the base reservoir 170 and the channel reservoir 178 away from the purge outlet 158 as represented by shaded portions 196. As another example, in FIGS. 11 and 12 the anode exhaust assembly 150 is shown tilted to a second tilted position so fluid collects in a portion of the base reservoir 170 and away from the purge outlet 158.

Figure 13:
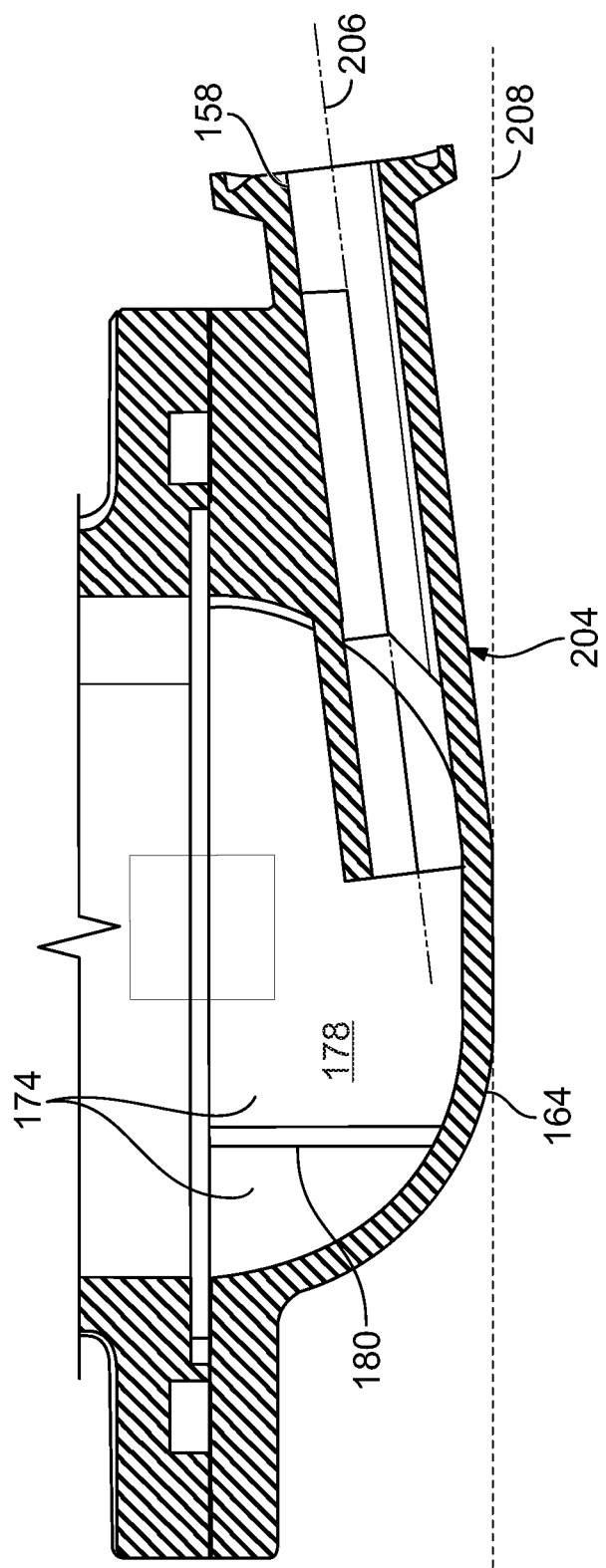
FIG. 13 is a side view, in cross-section, of another example of a portion of the exhaust reservoir assembly of FIG. 4 showing an example of an angled outlet tube.

FIG. 13 illustrates an example of the anode exhaust assembly 150 including a tube portion 204 extending at an angle from the base reservoir 170 to the purge outlet 158. A centerline 206 of the tube portion 204 may be oriented at positive angle relative to a horizontal axis 208 extending through an antipodal point of the base reservoir 170. Orienting the tube portion 204 at an angle further assists in managing fluid collection to prevent blockage of the purge outlet 158 when the fluid freezes since the purge outlet 158 is oriented above a lower portion of the inner surface of the base reservoir 170.

Figure 14:
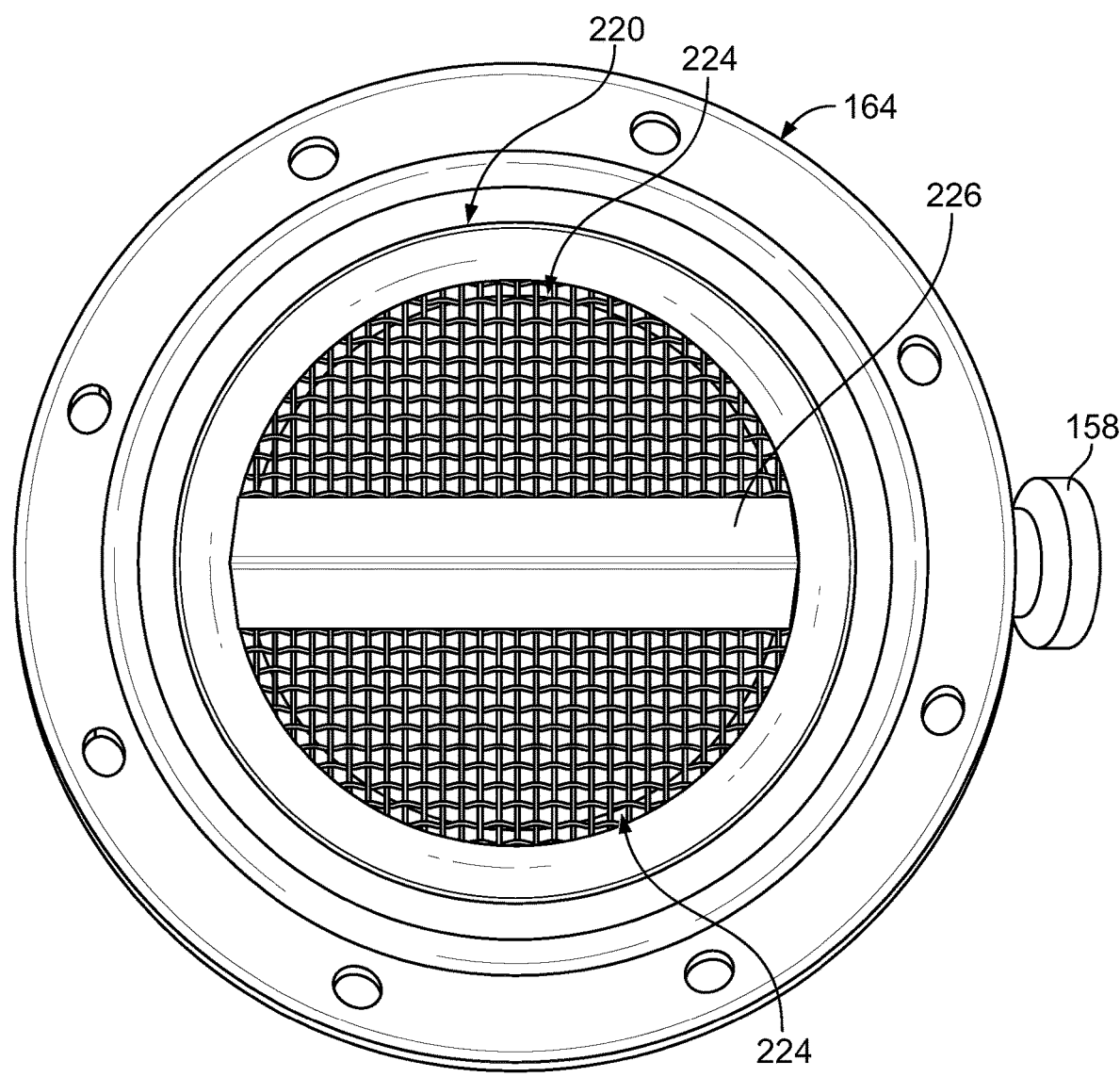
FIG. 14 is a top plan view of an example of a cap for a base member of the exhaust reservoir assembly of FIG. 4.

FIG. 14 illustrates an example of a cap 220 to assist in directing fluid within the housing cavity 168 toward the base reservoir 170 instead of the channel reservoir 178. The cap 220 may be sized for mounting to the base member 164 and include pass-through portions 224 and a divert portion 226. While the divert portion 226 is shown having a triangle shape, it is contemplated that other shapes are available to prevent water traveling from the housing cavity 168 directly into the channel reservoir 178. For example, the divert portion 226 may have a curve shape or a flat shape. The cap 220 may be arranged upon the base member 164 so the pass-through portions 224 are each above one of the sections of the base reservoir 170. The cap 220 may be arranged upon the base member 164 so the divert portion 226 is above the channel reservoir 178. The pass-through portions 224 and the divert portion 226 may be arranged with one another so that fluid is influenced to travel toward the pass-through portions 224 and into one of the sections of the base reservoir 170.

Figure 15:
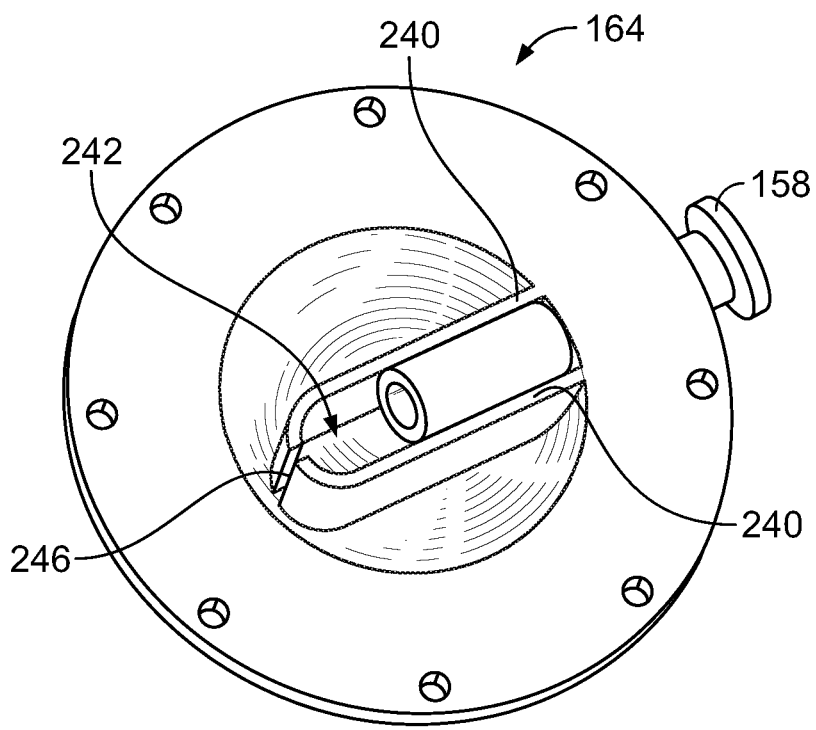
FIG. 15 is a perspective view of another example of an exhaust reservoir assembly with an upper housing removed to show internal components.

FIG. 15 illustrates an example of the base member 164 of the anode exhaust assembly 150 including a single wall 240 within the base reservoir 170 defining a horseshoe-shaped channel reservoir 242. The single wall 240 may define an opening 246 for fluid to pass from the base reservoir 170 to the horseshoe-shaped channel reservoir 242. The opening 246 may be located in various locations relative to the purge outlet 158 based on a shape of the single wall 240.

Figure 16:
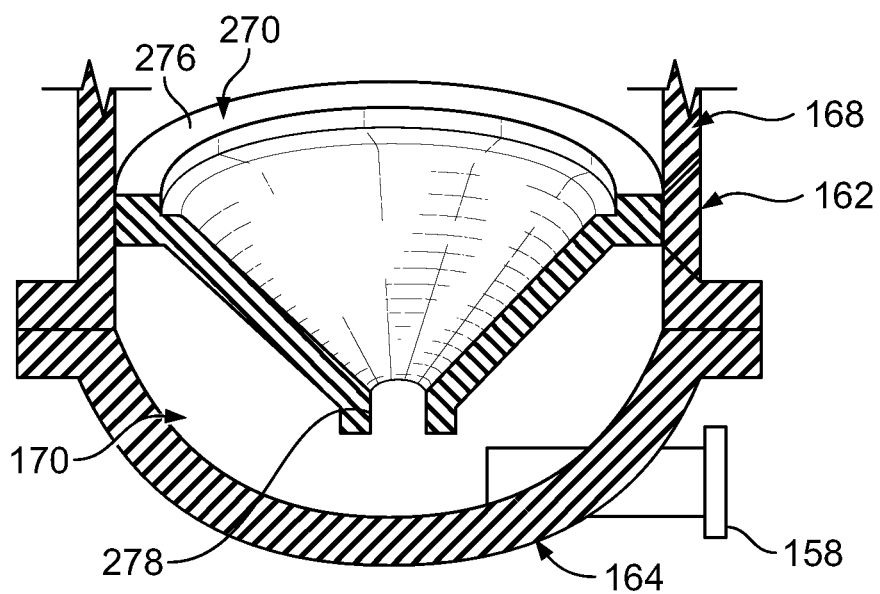
FIG. 16 is a side view, in cross-section, of another example of an exhaust reservoir assembly having a cone member disposed within an upper housing.

FIG. 16 illustrates an example of a cone member 270 for operation with the anode exhaust assembly 150. The cone member 270 may assist in directing fluid collected within the housing cavity 168 toward the base reservoir 170 instead of one of the examples of channel reservoirs. The cone member 270 may be secured to an inner surface of the housing 162. For example, a rim portion 276 of the cone member 270 may be shaped to correspond to a shape of the housing cavity 168 to facilitate a seal therebetween. The cone member 270 may be funnel-shaped and include an opening 278 oriented above the base reservoir 170. It is contemplated that the cone member 270 may have more than one opening 278 to direct the fluid to various portions of the base reservoir 170 instead of one of the examples of channel reservoirs.

Figure 17:
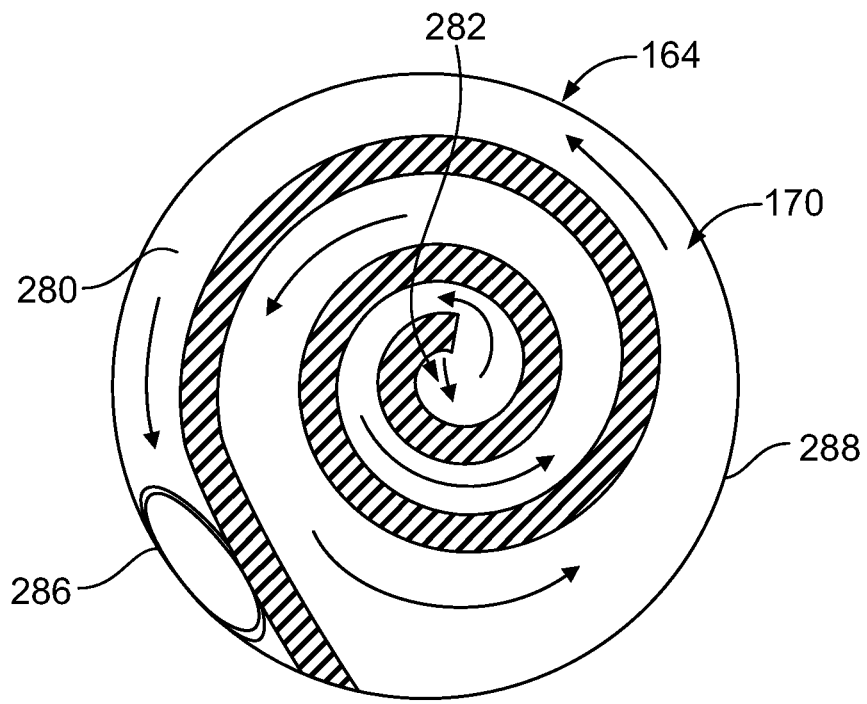
FIG. 17 is a top plan view of an example of a base member for an exhaust reservoir assembly in which the base member includes a first spiral wall.

FIG. 17 illustrates an example of the base member 164 including a spiral shape wall 280. In this example, the spiral shape wall 280 wraps throughout the base reservoir 170 from a central portion 282 to an outlet 286, such as a purge outlet, to define a spiral channel reservoir 288. The central portion 282 of the base reservoir 170 may be arranged with the cone member 270 so that fluid collected from the housing cavity 168 first enters the spiral channel reservoir 288 at the central portion 282 or epicenter of the base reservoir 170. Similar to the embodiments described above, the fluid entering the spiral channel reservoir 288 collects at the central portion 282 away from the outlet 286 so that under cold conditions, frozen fluid collection near the outlet 286 is prevented or minimized.

Figure 18:
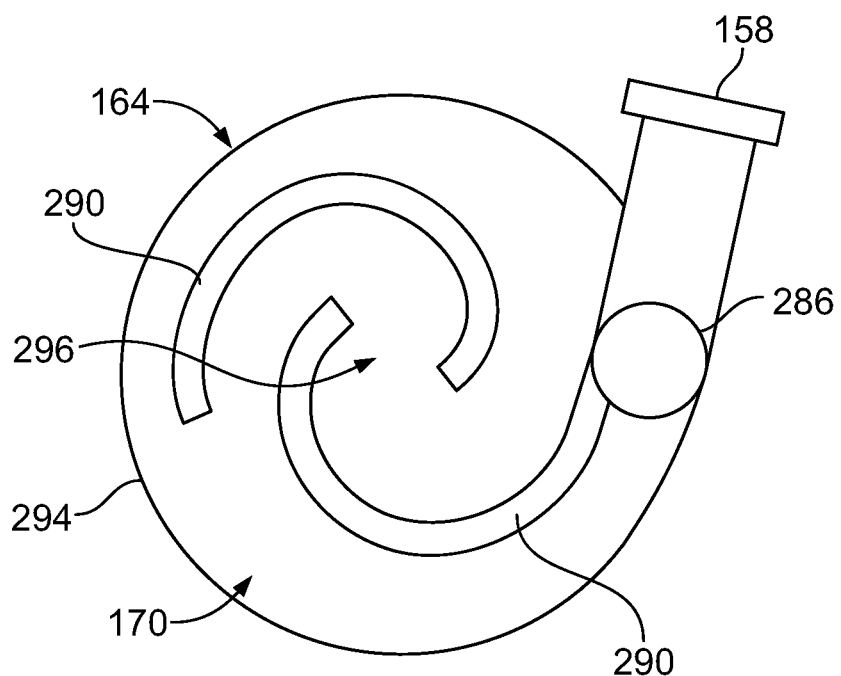
FIG. 18 is a top plan view of another example of a base member for an exhaust reservoir assembly in which the base member includes a second spiral wall.

FIG. 18 illustrates an example of the base member 164 including a spiral shape wall having two walls 290. In this example, each of the two walls 290 is curved and arranged with one another to form a spiral channel reservoir 294. A central portion 296 of the base reservoir 170 may be arranged with the cone member 270 so that fluid collected from the housing cavity 168 first enters the spiral channel reservoir 294 at the central portion 296. Similar to the embodiments described above, the fluid entering the spiral channel reservoir 294 collects at the central portion 296 away from an outlet 298 so that under cold conditions, frozen fluid collection near the outlet 298 is prevented or minimized.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. An anode exhaust assembly comprising:
a housing; and
a base member supporting the housing and including a base reservoir having a channel reservoir defined between two walls and a purge outlet open to the channel reservoir,
wherein each of the walls defines an opening fluidly connecting the reservoirs located at a base reservoir inner surface such that fluid accumulating on a housing inner surface collects in the base reservoir prior to entering the channel reservoir wherein each of the openings is located at a curvature of the base reservoir, wherein each of the openings is located at a curvature of the base reservoir, wherein each of the openings is located at a curvature of the base reservoir.

2. The assembly of claim 1 further comprising a cone member secured to an inner surface of the housing and including at least one cone opening oriented within the housing to direct fluid from a housing cavity to the base reservoir and not to the channel reservoir.

3. The assembly of claim 2 further comprising a cap mounted to the base member and including a divert member oriented above the channel reservoir to direct fluid to the base reservoir instead of the channel reservoir.

4. The assembly of claim 1, wherein each of the walls is arranged upon the base reservoir inner surface such that fluid accumulating on the housing inner surface collects in the base reservoir prior to entering the channel reservoir under freezing thermal conditions.

5. An anode exhaust assembly comprising:
a housing; and
a base member supporting the housing and including a base reservoir having a channel reservoir defined between two walls and a purge outlet open to the channel reservoir,
wherein each of the walls defines an opening fluidly connecting the reservoirs located at a base reservoir inner surface such that fluid accumulating on a housing inner surface collects in the base reservoir prior to entering the channel reservoir wherein each of the openings is located at a curvature of the base reservoir; and
a tube extending from the channel reservoir to the purge outlet, wherein the tube is oriented at a positive angle relative to a horizontal axis extending through an antipodal point of the base reservoir.

6. A vehicle fuel cell system comprising:
an electric machine; and
a fuel cell stack in electrical communication with the electric machine and including an anode exhaust assembly having a purge outlet to purge fluids from an anode,
a housing; and
a base member supporting the housing and including a base reservoir having a channel reservoir defined between two walls and the purge outlet open to the channel reservoir,
wherein each of the walls defines an opening fluidly connecting the reservoirs located at a base reservoir inner surface such that fluid accumulating on a housing inner surface collects in the base reservoir prior to entering the channel reservoir wherein each of the openings is located at a curvature of the base reservoir.

7. The system of claim 6 further comprising a cone member mounted within the housing to direct fluid to a central portion of the base reservoir.

8. The system of claim 7, wherein one of the two walls is a first wall, and the first wall defines a spiral shape having an epicenter located at the central portion and an end portion located adjacent the purge outlet.

9. The system of claim 8 further comprising a second wall which is the other wall of the two walls, wherein the first wall and the second wall extend across the base reservoir to define the channel reservoir open to the purge outlet, and wherein each of the first wall and the second wall define the opening arranged relative to the curvature of the base reservoir to influence fluid distributed within the housing to collect in the base reservoir prior to entering the channel reservoir.

10. The system of claim 8 further comprising a cap mounted to the base member and including a divert member oriented above a channel reservoir defined by the first wall to direct fluid to the base reservoir instead of the channel reservoir.

11. The system of claim 8 further comprising a tube open to the purge outlet and extending into a channel reservoir defined by the first wall.

12. The system of claim 8, wherein the first wall defines a horseshoe-shaped channel reservoir and an opening fluidly connecting the base reservoir and the horseshoe-shaped channel reservoir such that fluid collects in the base reservoir prior to entering the horseshoe-shaped channel reservoir.

13. An anode exhaust assembly comprising:
a housing; and
a base member supporting the housing and including a base reservoir having a semi-spherical shape and a channel reservoir defined by at least one wall and including a purge outlet open to the channel reservoir, wherein the at least one wall defines a first opening fluidly connecting the base reservoir to the channel reservoir, and wherein the first opening is located at a curvature of an inner surface of the base reservoir such that fluid collecting on a housing inner surface travels to the base reservoir prior to entering the channel reservoir.

14. The assembly of claim 13 further comprising a cone member secured within the housing and including at least one cone opening oriented above a portion of the base reservoir to direct fluid collecting within the housing to the base reservoir.

15. The assembly of claim 13, wherein the at least one wall is horseshoe-shaped and the first opening is located at a curve of the horseshoe shape.

16. The assembly of claim 13 further comprising a second wall defining a second opening, wherein the at least one wall and the second wall extend across the base reservoir and are spaced from one another to further define the channel reservoir, and wherein the second opening is located opposite the first opening upon another curvature of the inner surface of the base reservoir such that fluid collects within the base reservoir prior to entering the channel reservoir.

17. The assembly of claim 16 further comprising a cap mounted to the base member and including a divert member oriented above the channel reservoir to direct fluid to the base reservoir instead of the channel reservoir.

* * * * *